UNITED STATES PATENT OFFICE.

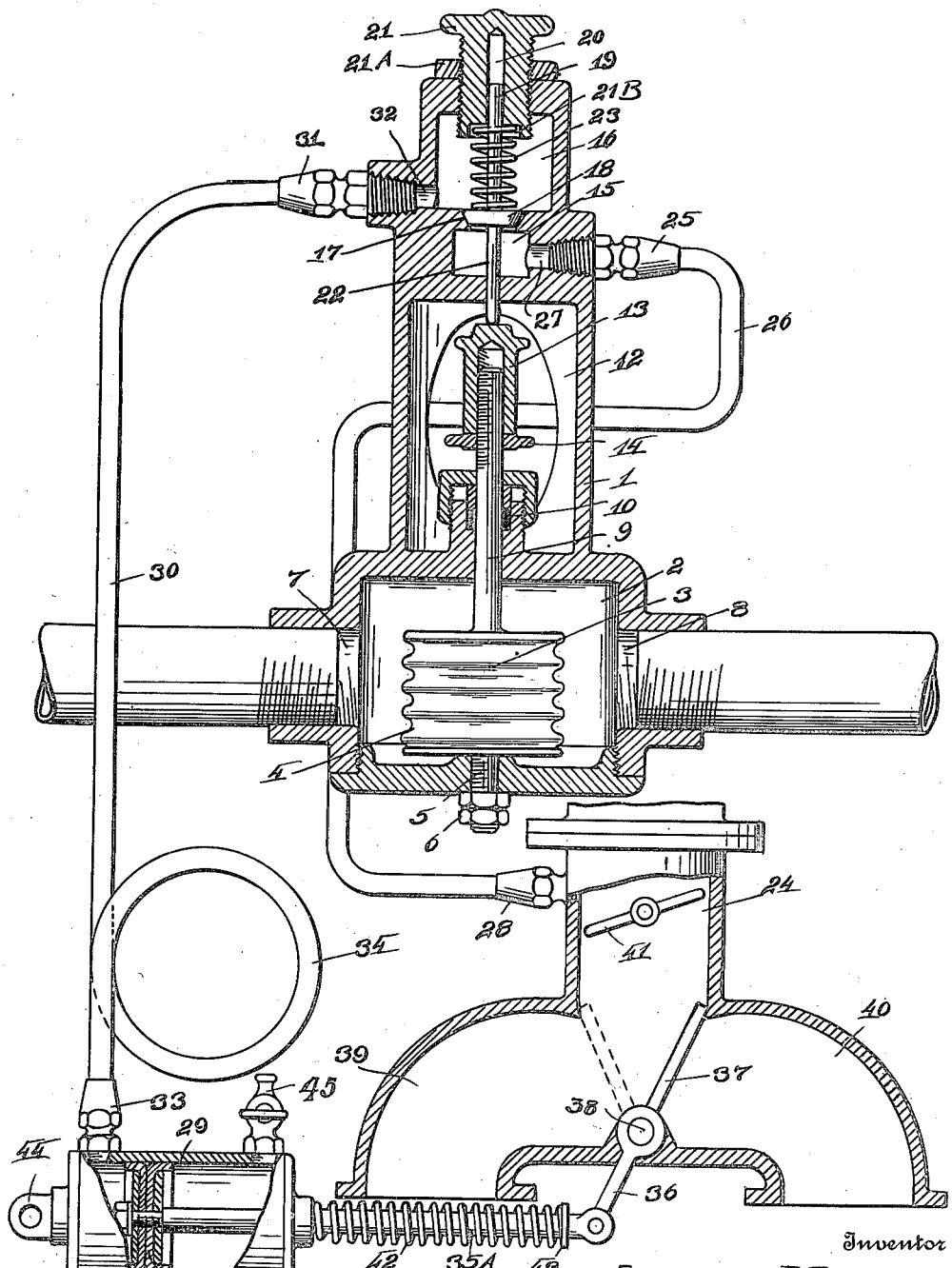

FREDERICK J. DECKER, OF ROCHESTER, NEW YORK, ASSIGNOR TO GEORGE W. HENNER, OF ROCHESTER, NEW YORK.

THERMOSTATIC CONTROLLING DEVICE.

1,323,456.  Specification of Letters Patent.  Patented Dec. 2, 1919.

Application filed October 2, 1918. Serial No. 256,620.

*To all whom it may concern:*

Be it known that I, FREDERICK J. DECKER, a citizen of the United States, residing at Rochester, in the county of Monroe and State of New York, have invented certain new and useful Improvements in Thermostatic Controlling Devices, of which the following is a specification.

It is well-known that in running an internal combustion engine with kerosene it is desirable to first start and run the engine with gasolene until the engine has become heated and thereafter kerosene can be used with much less difficulty than if the start is made with kerosene in the first place. Therefore it is desirable to provide two carbureters, one for gasolene, and the other for kerosene, and feed entirely from the one carbureter at the start, and feed entirely from the other carbureter after the heating of the engine has been accomplished sufficient to vaporize the kerosene.

This invention relates to thermostatic controlling devices for the two carbureters and has for its object the provision of an apparatus in combination with a thermostat whereby the feed of the fuel is positively controlled through the thermostat.

With this and other objects in view, this invention comprises a combination and arrangement of devices which will be fully illustrated in the drawing, described in the specification and pointed out in the claims at the end thereof.

In the accompanying drawing:

The figure is a diagrammatical sectional view of the thermostatic controlling device and the parts associated therewith.

The use of a thermostat alone for regulating a carbureter is connected with many difficulties in that it requires a highly expansive thermostat with sufficient power and range of movement to overcome the friction of all the connecting parts that are operated by it. Such a thermostat is not very sensitive for it takes a considerable change in temperature to expand or contract the parts of the thermostat a distance sufficient to operate the controlling device of the carbureter.

A dilatory action in a thermostat is especially undesirable when the thermostat is used in connection with hydro-carbon engines for the purpose of controlling its fuel. In this case the heat generated by the engine varies when running at different speeds but the variation in temperature would not be great enough to be sufficiently perceptible by the thermostat to perform its work solely by its own expansion or contraction and do it quickly.

The present invention is adapted for use in connection with a bi-fuel carbureter or a series of carbureters, each supplying a different grade of fuel, and the controlling device, hereinafter described, operates a valve which controls the different fuels from as many carbureters in such a manner that the more easily vaporized or light fuel is fed to the motor until it is warmed up sufficient to vaporize the heavier fuel. The adjustment of the device is so sensitive that a small change in temperature at the point where it is necessary to change over from the lighter to the heavier fuel or vice-versa is made to fully operate the device so as to change the fuel according to the requirement.

As shown in the drawing, the thermostatic control consists of a housing 1, which is provided with a chamber at the bottom in which the thermostat 3 is mounted. For this purpose, any one of the well-known expanding types of thermostats which employ an expanding member 4, may be used and mounted on the inside of the chamber 2 by means of a stud 5. The bottom of the chamber 2 is suitably threaded to the housing and supports the thermostat 3 by means of the threaded stud 5 which passes therethrough with the clamping nuts 6 threaded on the outside thereof, to hold the expanding member 4 rigidly in place in the inside of the chamber.

Through suitable piping the chamber 2 is connected in series with the radiator of the motor and the water jackets surrounding the cylinders of the motor which makes the water circulating through these parts also pass through the chamber 2. An inlet 7 and an outlet 8 are therefore provided in the chamber 2 through which the water, heated by the cylinder of the motor, is adapted to pass in on one side and out through the other as shown in the figure.

A rod 9, forming an extension of the expanding member 4, passes through the stuffing box 10 provided in the housing and projects into a casing 12 forming part of the housing 1. The rod 9 is threaded on the outer end for the adjusting socket 13 to be screwed up or down thereon. A locknut 14 is threaded to the rod 9 below the adjusting socket 13, which locknut is used to lock the socket to the end of the rod at any desired point thereon for a purpose that will presently appear.

In the upper portion of the housing 1 are provided the chambers 15 and 16. These chambers are in line with each other and are located above each other with an opening 17 leading through the separating wall between them.

The opening 17 is provided with a valve seat for the valve 18 to rest on. The upwardly projecting valve stem 19 is held vertically in line by, and is adapted to slide in the socket 20 provided in the adjusting screw plug 21, while the downwardly projecting valve stem 22 passes through an opening in the bottom of the chamber 15 with its end normally resting on top of the adjusting socket 13 on the end of the stem 9.

An expansion spring 23 surrounding the valve stem 19 is interposed between the upper face of the valve 18 and the seat 21$^B$ provided at the bottom of the adjusting screw 21 whereby the valve 18 is forced into the valve seat in the opening 17. A locknut 21$^A$ is provided on the upper end of the adjusting screw 21 whereby this screw may be held in place at the point where the spring 23 is under the desired compression between the end of the screw and the valve to secure the proper pressure for forcing the valve onto its seat.

The chamber 15, near the upper end of the housing 1, is connected with the fuel intake pipe 24 which leads to the manifold of the motor. For this purpose, a coupling 25, having one end of the metal tubing 26 attached thereto, is threaded into the opening 27 leading out of the side of the chamber 15 while a similar coupling 28 to which the other end of the tubing 26 is attached, leads into the fuel intake pipe 24.

The chamber 16 adjoining the chamber 15 is similarly connected with a cylinder 29. A tubing 30, having a coupling 31 threaded into the opening 32 leading out of the side of the chamber 16 and a coupling 33 leading into one end of the cylinder 29 are provided for this purpose. The tubing 30 is bent into a loop 34 at some convenient point to allow for any expanding thereof.

Mounted to slide in the cylinder 29 is a piston 35 which is carried on the end of the piston rod. The piston 35 is provided with suitable packing to make an air-tight fit with the cylinder wall. The piston rod 35$^A$ passes out through an opening in the head of the cylinder and is connected to the lever 36 operating the deflecting valve 37. This deflecting valve 37 is mounted to swing on the pin 38 on the inside of and between the intake ducts 39 and 40.

A carbureter (not shown) is connected to each of these intake ducts 39 and 40 and the deflecting valve 37 operates to deflect the gases from either one or the other of these carbureters into the intake pipe 24 where the throttle valve 41 regulates the amount of gas flowing from the intake pipe 24 to the manifold (not shown).

An expansion spring 42, surrounding the piston rod 35$^A$, is interposed between a washer 43 carried near the end of the piston rod and the head of the cylinder 29. This spring is adapted to move the piston rod in one direction and bring it back to its normal position as will presently appear.

The cylinder 29 may be conveniently attached to any part of the engine by means of the lug 44 provided at the rear end of the cylinder.

The two intake ducts 39 and 40 have each a carbureter connected thereto of which the carbureter attached to the duct 39 supplies kerosene vapors while the other carbureter attached to the duct 40 supplies gasolene vapor.

It is a well-known fact that the gasolene vapors at a low temperature ignite more readily than the kerosene vapors at the same temperature, but after the motor has been running for a short time on gasolene, the heat generated by the products of combustion can be utilized to heat the kerosene vapors so as to make them ignite with the same perfect combustion as gasolene vapors. For this reason, the motor must be started and kept running for a short time with the vapors supplied by the gasolene carbureter connected to the intake duct 40 which supplies gasolene vapors until the motor has been warmed up. The gasolene carbureter can then be shut off and the kerosene carbureter connected instead with the manifold of the motor.

To perform this operation automatically, the intake pipe 24 or its equivalent is connected with the chamber 15 through the tubing 26. The vacuum created in the manifold of the motor while running, is therefore also present in the chamber 15. When the motor has been started up and is running on gasolene vapors supplied through the duct 40, the cooling water circulating around the cylinders and passing through the radiator is raised in temperature by the products of combustion of the gasolene vapors exploding in the cylinders. The water warmed up in this manner passes through the chamber 2 on its way to the radiator and expands the member 4 of the thermostat.

The rod 9 is thus raised and gradually lifts the valve stem 22 by means of the adjusting socket 13. This in turn lifts the valve 18 from its seat so that the air from the chamber 16 is also exhausted and a partial vacuum is created in the rear end of the cylinder 29 which is connected with the chamber 16 through the tubing 30.

The piston 35 operating in the cylinder 29 is then forced toward the rear end in which the air has been exhausted, by the atmospheric pressure admitted through the adjustable vent 45 and in doing so rocks the lever 36 by means of its piston rod 35^A from the dotted line position to the full line position shown in Fig. 1. This in turn throws the deflecting valve 37 from one side to the other and opens the duct 39 for the kerosene vapors to pass into the intake pipe while at the same time it closes the duct through which the gasolene vapors were passing. The kerosene vapors are then exclusively supplied to the motor for combustion therein.

The adjustments provided on the apparatus as previously described are adjusted so that the change of the fuel supply from gasolene to kerosene vapors, as above pointed out, takes place at a time when the motor has warmed up sufficiently to make the mixture of air and kerosene vapors burn or explode in the cylinders.

The apparatus is so constructed that it will quickly respond to any change in temperature and if the motor should cool off sufficiently to interfere with the ready burning or exploding of the kerosene vapor in the cylinders, the apparatus will operate the deflecting valve 39 in the reverse direction.

This is done by the expansion of the spring 42 which forces the piston 35 in the reverse direction after the partial vacuum has destroyed itself on the seating of the valve 18. The seating of the valve is caused by the contraction of the thermostat as soon as the temperature of the water passing through the chamber 2 falls and indicates that the cylinders of the motor are cooling off and are not hot enough to burn the heavier fuel to good advantage.

From the foregoing it will be seen that the apparatus comprising this invention acts as a relay mechanism between the thermostat and the fuel controlling valve. For this reason, the movement of the thermostat for operating this relay mechanism does not need to be a long one and a more sensitive instrument which responds quickly to any change in temperature can, therefore, be embodied therein.

I claim:

1. In a thermostatic controlling device for hydro-carbon engines the combination of a thermostat, a relay mechanism operated by a vacuum and controlled by said thermostat to regulate the fuel supply for said engine on the action of said thermostat, said thermostat in turn being acted upon by the heating of said engine, said vacuum being created by the running of the engine.

2. In a thermostatic controlling device for hydro-carbon engines having an intake pipe, the combination of a controlling valve for regulating the fuel passing into said intake pipe, a thermostatic means for operating said controlling valve, said means being connected with said intake pipe and operated by the vacuum created therein, said thermostat being adapted to control the operation of said controlling means, on the heating up or cooling off of said engine.

3. In a thermostatic controlling device for hydro-carbon engines having an intake pipe and a water cooling system for the cylinders of said engine, the combination of a controlling valve for regulating the fuel passing into said intake pipe, a thermostatic means for operating said controlling valve, said means being connected with said intake pipe and operated by vacuum created therein, said thermostat being adapted to control the operation of said means on the rising or falling of temperature of water circulating through said water circulating system.

4. In a thermostatic controlling device for hydro-carbon engines, having a fuel intake pipe and a water cooling system, the combination of a housing, a chamber provided in the bottom of said housing, said chamber being connected in series with said water cooling system, a thermostat mounted in said chamber, a relay mechanism operated by the vacuum created in said intake pipe and controlled by said thermostat, said relay mechanism operated by the vacuum created in said intake pipe and controlled by said thermostat, said relay mechanism being adapted to regulate the fuel supply into said intake pipe.

5. In a thermostatic controlling device for hydro-carbon engines having a fuel intake pipe and a water cooling system, the combination of a housing, a chamber formed in the bottom of said housing, said chamber being connected with said water cooling system, a thermostat mounted in said chamber, a pair of chambers formed in the top of said housing and in line with each other, an opening connecting said chambers, a valve adapted to open and close said opening, said valve being operated by said thermostat, one of said pair of chambers being connected with said fuel intake pipe to create a vacuum therein, a fuel controlling valve, means for controlling said fuel controlling valve, said means being operated by the vacuum created in the second of said chambers on the lifting of said valve by said thermostat.

6. In a thermostatic controlling device for hydro-carbon engines having a fuel intake pipe and a water cooling system, the combination of a housing, a chamber formed in the bottom of said housing, said chamber being connected with said water cooling system, a thermostat mounted in said chamber, a pair of chambers formed in the top of said housing not in line with each other, an opening connecting said chambers, a valve adapted to open and close said opening, said valve being operated by said thermostat, one of said pair of chambers being connected with said fuel intake pipe to create a vacuum therein, a fuel controlling valve, a cylinder connected with the second of said chambers, a piston mounted to slide in said cylinder, a fuel controlling valve connected to said piston, said piston being operated by the vacuum created in one end of said cylinder on the lifting of said valve between said pair of chambers.

7. In a thermostatic controlling device for hydro-carbon engines the combination of a thermostat, a relay mechanism operated by the vacuum generated by said engine, and controlled by said thermostat to regulate the fuel supply for said engine on the action of said thermostat, said thermostat in turn being acted upon by the heating of said engine.

In testimony whereof I affix my signature.

FREDERICK J. DECKER.